US008712247B2

(12) United States Patent
Hauske (10) Patent No.: US 8,712,247 B2
(45) Date of Patent: Apr. 29, 2014

(54) CLOCK PHASE RECOVERY APPARATUS

(75) Inventor: Fabian Nikolaus Hauske, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 220 days.

(21) Appl. No.: 13/369,377

(22) Filed: Feb. 9, 2012

(65) Prior Publication Data

US 2013/0039665 A1 Feb. 14, 2013

Related U.S. Application Data

(63) Continuation of application No. PCT/CN2010/070692, filed on Feb. 20, 2010.

(51) Int. Cl.
*H04B 10/00* (2013.01)

(52) U.S. Cl.
USPC .......................................................... 398/155

(58) Field of Classification Search
USPC .......................................................... 398/155
See application file for complete search history.

(56) References Cited

U.S. PATENT DOCUMENTS

| 4,975,929 | A | 12/1990 | Apple et al. |
|---|---|---|---|
| 8,095,019 | B2 | 1/2012 | Kaneda et al. |
| 8,175,455 | B2 | 5/2012 | Takeshita et al. |
| 2006/0285855 | A1* | 12/2006 | Sun et al. ........................ 398/155 |
| 2009/0190926 | A1 | 7/2009 | Charlet et al. |
| 2010/0021169 | A1 | 1/2010 | Takeshita et al. |
| 2010/0028011 | A1 | 2/2010 | Kaneda et al. |

FOREIGN PATENT DOCUMENTS

| CN | 101499873 A | 8/2009 |
|---|---|---|
| CN | 101523772 A | 9/2009 |
| WO | WO 2007/045071 | 4/2007 |
| WO | WO 2008/089582 A1 | 7/2008 |

OTHER PUBLICATIONS

Godard, Dominique N.; Passband Timing Recovery in an All-Digital Modem Receiver; 1978 IEEE (7 pgs.).
Kuschnerov, Maxim et al.; "Digital Timing Recovery for Coherent Fiber Optic Systems"; 2008 IEEE (3 pgs.).
Gardner, Floyd M.: "A BPSK QPSK Timing Error Detector for Sampled"; IEEE Transactions on Communications, vol. COM-34, No. 5 May 1986 (7 pgs.).
Oerder, Martin et al.; "Digital Filter and Square Timing Recovery"; ; IEEE Transactions on Communications, vol. COM-36, No. 5 May 1988 (8 pgs.).
Kuschnerov, Maxim et al.; "DSP for Coherent Single-Carrier Receivers"; Journal of Lightwave Technology, vol. 27, No. 16, Aug. 15, 2009 (9 pgs.).

(Continued)

*Primary Examiner* — Leslie Pascal (57) ABSTRACT

A clock phase recovery apparatus includes a clock estimator for estimating a first clock signal and a second clock signal upon the basis of an input signal, the input signal comprising a first sub-signal according to a first optical polarization and a second sub-signal according to a second optical polarization, the first clock signal comprising a first clock magnitude and a first clock phase, the second clock signal comprising a second clock magnitude and a second clock phase, and a selector for selecting the first clock phase to form the estimated clock phase if the first clock magnitude is greater than the second clock magnitude, or for selecting the second clock phase to form the estimated clock phase if the second clock magnitude is greater than the first clock magnitude.

14 Claims, 5 Drawing Sheets

(56) References Cited

OTHER PUBLICATIONS

Louchet, Hadrien et al.; "FFT-Based Digital Clock Recovery for Coherent Transmission Systems with Multilevel Modulation"; ECOC Sep. 20-24, 2009, Vienna, Austria (2 pgs.).

Kuschnerov, Maxim et al.; "Joint Equalization and Timing Recovery for Coherent Fiber Optic"; ECOC Sep. 21-25, 2008, Brussels, Belgium; Mo.3.D.3 (2 pgs.).

Zibar, Darko et al.; "Analysis and Dimensioning of Fully digital Clock Recovery for 112 Gb/s Coherent Polmux QPSK Systems"; ECOC Sep. 20-24, 2009, Vienna, Austria; Paper 7.3.4; VDE Verlag GMBH (2 pgs.).

European Patent Office Communication, pursuant to Rule 62 EPC, the supplementary European search report (Art. 153(7) EPC) and the European search opinion related to Application No. 10845989.2-1237; dated (mailed) Aug. 2, 2012.

PCT International Search Report of the International Searching Authority; dated (mailed) Nov. 25, 2010, related to Application No. PCT/CN2010/070692, Huawei Technologies Co., Ltd.

PCT Written Opinion of the International Searching Authority; dated (mailed) Nov. 25, 2010, related to Application No. PCT/CN2010/070692, Huawei Technologies Co., Ltd.

* cited by examiner

CLOCK PHASE RECOVERY APPARATUS

CROSS-REFERENCE TO RELATED APPLICATIONS

This application is a continuation of PCT Application No. PCT/CN2010/070692, filed on Feb. 20, 2010, entitled "Clock Phase Recovery Apparatus," which is hereby incorporated herein by reference.

BACKGROUND OF THE INVENTION

The present invention addresses the field of clock recovery in communication systems.

TECHNICAL FIELD

In order to recover the time basis, usually a clock signal may be estimated either in time domain or in frequency domain. For estimating the clock signal in a time domain, e.g. the Gardner algorithm is described in F. M. Gardner, "A BPSK/QPSK timing-error detector for sampled receiver", IEEE Transactions on Communications, vol. COM-34, no. 5, May 1986, or the square-timing algorithm as described in M. Oerder, H. Meyr, "Digital filter and square-timing recovery", IEEE Transactions on Communications, vol. 36, no. 5, May 1988, or a histogram-based algorithm as described in M. Kuschnerov, F. N. Hauske et al., "DSP for coherent single-carrier receivers", IEEE JLT, vol. 27, no. 16, Aug. 15, 2009, pp. 3614-3622, may be employed. For frequency domain timing recovery, the Godard algorithm is described in D. N. Godard, "Passband Timing Recovery in an All-Digital Modem Receiver" IEEE Trans. Commun., vol. 26, no. 5, pp. 517-523, 1978.

By way of example, the square-timing algorithm exploits information of one polarization, wherein, however, polarization effects resulting from PMD (Polarization Mode Dispersion) or the SOP (State Of Polarization) may reduce the magnitude of the clock signal which may lead to an erroneous timing recovery.

SUMMARY OF THE INVENTION

One embodiment of the present disclosure is based on, for example, the finding that robust clock signal estimation may be performed upon the basis of a plurality of clock signal estimates, which may, for example, be derived upon the basis of a plurality of differently filtered versions of an input signal from which the clock tone is fully estimated. Accordingly, the best clock tone estimate may be selected upon the basis of a comparison of the magnitudes of the clock tone estimates. Moreover, it has been found that the clock tone estimate, which is associated with the maximum magnitude, provides the most accurate estimate of the clock signal phase which determines the clock signal, i.e. clock tone estimate.

In some embodiments, the present disclosure relates to a clock phase recovery apparatus for estimating an estimated clock phase from an input signal. The clock phase recovery apparatus comprises a clock estimator for estimating a first clock signal and for estimating a second clock signal upon the basis of the input signal. Preferably, the input signal comprises a first sub-signal according to a first optical polarization, and a second sub-signal according to a second optical polarization. Thus, the first clock signal may comprise a first clock magnitude and a first clock phase, and the second clock signal may comprise a second clock magnitude and a second clock phase. The clock phase recovery apparatus further comprises a selector for selecting the first clock phase to form the estimated clock phase if the first clock magnitude is greater than or equal to the second clock magnitude, or for selecting the second clock phase to form the estimated clock phase if the second clock magnitude is greater than the first clock magnitude.

In some embodiments, the estimator may be configured to differently filter the input signal to obtain a first filtered input signal and a second filtered input signal, to estimate the first clock signal upon the basis of the first filtered input signal, and to estimate the second clock signal upon the basis of the second filtered input signal. In order to differently filter the input signal, the estimator may be configured to differently filter input signal copies or input signal versions to obtain the respective filtered input signal. By way of example, the estimator may be configured to rotate each input signal copy by a certain, predetermined, polarization angle in order to reduce the SOP effects or may be configured to compensate for a certain, predetermined, value of chromatic dispersion, in order to reduce the dispersion effects, when estimating the respective clock signal.

In some embodiments, the clock estimator may comprise the clock estimator comprises a first chromatic dispersion filter for filtering the input signal to obtain a first filtered input signal, and a second first chromatic dispersion for filtering the input signal to obtain a second filtered input signal.

In some other embodiments, the clock estimator may comprise a first polarization rotation filter for filtering the input signal to obtain a first filtered input signal, and a second polarization rotation filter for filtering the input signal or an input signal copy to obtain a second filtered input signal, the first polarization rotation filter being configured to rotate the SOP of the input signal by a predetermined first polarization angle, the second polarization rotation filter being configured to rotate a polarization, i.e. the SOP of the input signal, by a predetermined second angle. The predetermined first and second polarization angles are preferably different and non-adjustable or adjustable in order to obtain differently filtered signal versions. By way of example, the rotation filter may affect the polarization state, i.e. the SOP, of the input signal. However, the timing phase remains unaffected.

In some embodiments, the clock estimator may comprise a first estimator arranged downstream the first polarization rotation filter to estimate the first clock signal upon the basis of the first filtered input signal, wherein the clock estimator comprises a second estimator arranged downstream the second polarization rotation filter to estimate the second clock signal upon the basis of the second filtered input signal. Therefore, the estimators may be arranged to estimate the first and the second clock signal in parallel. Further, the first and second polarization rotation filter may form a filter bank being arranged to simultaneously provide the respective filtered input signal to the respective estimator.

In some embodiments, the respective polarization rotation filter may be configured to perform a PMD filtering. By way of example, a first-order PMD filter with a certain DGD (differential group delay) value may be employed.

In some embodiments, the clock estimator may comprise a filter bank comprising a plurality of polarization rotation filters, each polarization rotation filter being configured to rotate the input signal by a different predetermined polarization angle, to obtain a plurality of filtered input signals, wherein the clock estimator is configured to estimate a plurality of clock signals upon the basis of the plurality of filtered input signals, and wherein the selector is configured to select the clock phase or the clock signal which has the greatest clock magnitude among the plurality of estimated clock signals to provide the estimated clock phase.

In some embodiments, the clock estimator may comprise a polarization rotation filter for rotating a SOP of the input signal at a first time instant by a predetermined first angle to obtain a first filtered input signal, and for rotating a SOP of the input signal at a second time instant by a predetermined second angle to obtain a second filtered input signal, and wherein the clock estimator may comprise an estimator for successively estimating the first clock signal upon the basis of the first filtered input signal and the second clock signal upon the basis of the second filtered input signal. Thus, the filtered input signals and, accordingly, the clock signal estimates are successfully provided using the same rotation filter. The rotation filter may be further configured to perform the PMD filtering.

In some embodiments, the clock estimator may comprise a filter bank comprising a plurality of chromatic dispersion filters, each chromatic dispersion filter being configured to filter the input signal by a different predetermined chromatic dispersion value, to obtain a plurality of filtered input signals, wherein the clock estimator is configured to estimate a plurality of clock signals upon the basis of the plurality of filtered input signals, and wherein the selector is configured to select the clock phase or the clock signal which has the greatest clock magnitude among the plurality of estimated clock signals to provide the estimated clock phase.

In some embodiments, the clock estimator may be configured to correlate the polarization components of the first sub-signal and correlate the polarization components of the second sub-signal to estimate the first clock signal and/or the second clock signal. The correlation means may be based on the auto correlation of one polarization component, e.g. the x-polarization component, or may be based on the cross correlation of both polarization components, e.g. correlation between the x- and the y-polarization signal. By way of example, the correlation may be performed in frequency domain.

In some embodiments, the selector may comprise a comparator for comparing the first clock magnitude and in order to differ determine the maximum magnitude.

In some embodiments, the clock phase recovery apparatus may further comprise a Fourier transformer for transforming a time domain signal into the input signal in frequency domain. Thus, the filtering and the clock signal estimation are performed in frequency domain.

In some embodiments, the clock estimator may be configured to estimate the first clock signal and the second clock signal upon the basis of the input signal comprising uncompensated chromatic dispersion. In other words, the input signal does not need to be filtered in order to remove chromatic dispersion as the selector anyway selects the maximum clock magnitude which is associated with the based estimate of the clock tone phase.

In some embodiments, the first sub-signal and the second sub-signal respectively comprise a horizontal polarization signal component, also referred to as x-polarization signal, and a vertical signal component, also referred to as y-polarization signal. Each signal component may be comprised by a real part and imaginary part, or amplitude and phase respectively.

The sub-signals may be provided by e.g. a polarization-diverse 90° hybrid being arranged upstream the clock phase recovery apparatus.

According to a further aspect, the disclosure relates to a communications receiver comprising the clock phase recovery apparatus.

According to a further aspect, the disclosure relates to a method for estimating an estimated clock phase. The method comprises estimating a first clock signal and a second clock signal upon the basis of an input signal, the input signal comprising a first sub-signal according to a first optical polarization and a second sub-signal according to a second optical polarization, the first clock signal comprising a first clock magnitude and a first clock phase, the second clock signal comprising a second clock magnitude and a second clock phase. The method further comprises selecting the first clock phase to form the estimated clock phase if the first clock magnitude is greater than the second clock magnitude, or selecting the second clock phase to form the estimated clock phase if the second clock magnitude is greater than the first clock magnitude.

According to a further aspect, the disclosure relates to a computer program with a program code for performing the method for estimating an estimated clock phase when run on a computer.

DETAILED DESCRIPTION OF THE IMPLEMENTATION FORMS

Figure 1:
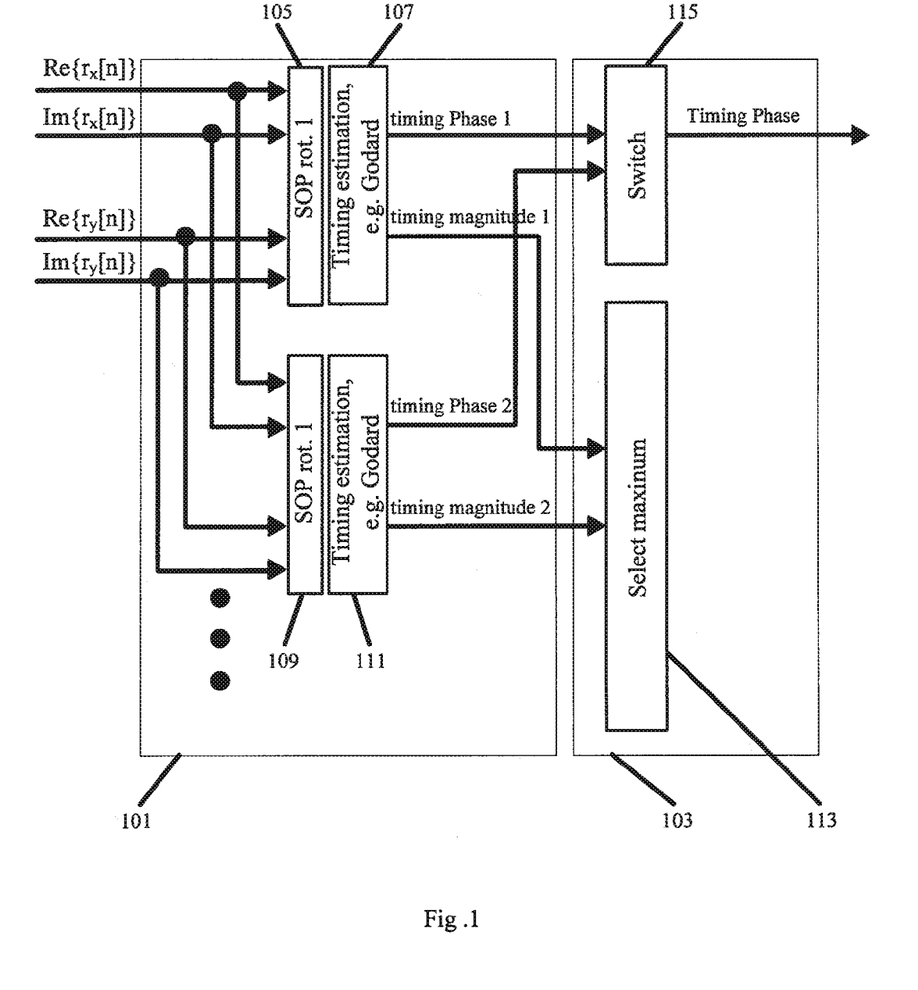
FIG. 1 shows a clock phase recovery apparatus according to an implementation form.

FIG. 1 shows a clock phase recovery apparatus according to an embodiment comprising a clock estimator 101 and a selector 103. The clock estimator comprises a first polarization rotation filter 105 and a first estimator 107 arranged after the first polarization rotation filter 105. The clock estimator 101 further comprises a second polarization rotation filter 109 and a second estimator 111 arranged after the second polarization rotation filter 109.

The first polarization rotation filter 105 and the second polarization rotation filter 109 respectively receive an input signal comprising a first sub-signal according to a first optical polarization, e.g. according to the x-polarization, and a second sub-signal according to a second optical polarization, e.g. according to a y-polarization. After filtering, each polarization rotation filter 105, 109 provide the respectively filtered version of the input signal to the respective estimator 107 and 111. The estimator 107 is configured to estimate a first clock signal upon the basis of the first filtered signal provided by the first rotation estimator 105, wherein the second estimator 111 is configured to estimate a second clock signal upon the basis of the second filter signal provided by the second polarization rotation filter 109.

Generally, the clock estimator 101 estimates the respective clock signal upon the basis of the input signal, wherein the estimated clock signals respectively comprise a clock signal magnitude (timing magnitude) and a clock signal phase (timing phase). The first and the second clock signal are provided to the selector 103 for further processing. The selector 103 comprises a maximum selector 113, e.g. a comparator, which is configured to receive the clock magnitudes from the estimators 105 and 111. The selector 103 further comprises a switch 115 receiving the clock phases. The switch 115 is controlled by the maximum selector 113 in order to output the estimated clock phase corresponding to the clock phase which is associated with the maximum clock magnitude.

The polarization rotation filter 105 and 109 may form PMD compensating filters, which compensate for the DGD and polarization rotation filter track the polarization rotation. This yields an optimum solution for providing the maximum clock tone. However, it is not required to estimate the timing information from the maximum clock tone. Further, accurate timing phase estimation can be also extracted from sub-optimum clock tones with slightly decreased magnitude. By way of example, no filtering in the one path and a polarization rotation of pi/4 in the other path may be performed.

According to some implementations, the polarization rotation filter 105 and 109 may form a bank of "matched" filters, each for a certain polarization rotation. All filters evaluate the clock signal magnitude and the clock signal phase in parallel. For clock phase estimation the filter with the largest clock tone magnitude may be chosen. The robustness and the accuracy of the estimation can be defined by the number and the setting of the matched filters. According to one requirement, two matched filter paths with no filtering in the one path and a polarization rotation of pi/4 in the other path may be provided. In FIG. 1, only two polarization rotation filters are exemplarily depicted. However, more than two polarization rotation filters may be employed.

With reference to FIG. 1, by choosing the branch with the maximum clock tone magnitude, the best timing phase may be selected. As the timing phase between each matched filters might vary by a certain offset, a timing phase correction might follow the switch to correct the offset if the previous and the consecutive timing phase estimation are from different matched filters.

According to some implementations, an improved variable for timing phase estimation is provided, which is obtained through selecting the best possible variable from a set of matched filters.

The matched filter 105, 109 may realize any or a combination of one or several polarization rotation elements, polarization phase shifters or birefringent elements.

In another implementation form, the filter 105, 109 may be realized by chromatic dispersion (CD) compensating filters with a different value of CD. Polarization filters and CD filters may also be combined in one filter realization to comprise the matched filters being a combination of amplitude-filters and phase-filters.

The switch 115 may select the best possible timing phase estimation from all available estimations at each matched filter branch. The selection criterion might be the clock tone magnitude. The structure is also suitable for closed loop timing phase acquisition and tracking.

As depicted in FIG. 1, the polarization filters 105 and 109 may form a "matched filter bank". By choosing the branch with the maximum clock tone magnitude, the best timing phase. As the timing phase between each matched filters might vary by a certain offset, a timing phase correction might follow the switch to correct the offset if the previous and the consecutive timing phase estimation are from different matched filters.

Generally, the estimation approach depicted in FIG. 1 is suitable for a timing phase estimation performed in the time domain or in the frequency domain. Furthermore, the matched filters can apply a full SOP rotation (polarization phase and angle), only a polarization rotation or a SOP rotation in combination with a birefringent element, which results in an additional DGD element. Thus, the estimation approach may be performed independently of the method for timing phase extraction.

According to some implementations, the filter 105 and 109 may incorporate a filter matrix with the input signal of each filter is $$r = [\text{Re}\{r_x\} + j\text{Im}\{r_x\}, \text{Re}\{r_y\} + j\text{Im}\{r_y\}]^T,$$

the output is accordingly $$p = [\text{Re}\{p_x\} + j\text{Im}\{p_x\}, \text{Re}\{p_y\} + j\text{Im}\{p_y\}]^T,$$

where r and p are complex valued variables. In general, the filtered signal is obtained by $p = Hr$, where the filter matrix $$H = \begin{bmatrix} H_{11}(\omega) & H_{12}(\omega) \\ H_{21}(\omega) & H_{22}(\omega) \end{bmatrix}$$

is composed by its components $H_{11}(\omega)$, $H_{12}(\omega)$, $H_{21}(\omega)$ and $H_{22}(\omega)$.

In particular, the filter may comprise a rotation of the SOP by a polarization rotation angle $\theta$. The rotation matrix may be applied as follows $$p_\theta = H_\theta r = \begin{bmatrix} \cos\theta & \sin\theta \\ -\sin\theta & \cos\theta \end{bmatrix} r$$

Alternatively, also DGD can be included by $$p_{\theta, DGD} =$$
$$H_\theta H_{DGD} H_{-\theta} r = H_\theta \begin{bmatrix} \exp\{j2\pi fDGD/2\} & 0 \\ 0 & \exp\{-j2\pi fDGD/2\} \end{bmatrix} H_{-\theta} r$$

Furthermore, mixed forms of rotation matrices and/or DGD elements with any combination of angles $\theta$ and DGD may be applied.

In an alternative embodiment of the invention, the filter may comprise a CD filter to yield $$p_{CD} = H_{CD} r$$

with the CD filter function $$H_{CD}(\omega) = H_{CD}(\omega) = e^{j \cdot \omega^2 \cdot \beta_2 \cdot L/(8\pi^2)}$$

where L is the length of the fiber, $\beta_2$ is the parameter of group velocity difference and $\omega$ is the radian frequency which relates by $\omega = 2\pi f$ to the angular frequency.

Furthermore, any combination of a polarization filter and CD filter may be applied According to some implementations, the filter bank may provide the two or more polarization filters 105, 109, wherein also standard timing recovery algorithms may be applied after each filter, e.g. frequency domain (FD) Godard timing recovery. The clock signal magnitudes after each filter indicate the best matching filter. The switch 115 may select the best estimation on basis of the maximum clock tone magnitude among all filtered results.

According to some implementations, the clock phase recovery apparatus forming digital timing recovery may be placed after the digital CD compensation stage, as digital timing recovery requires near zero residual CD. Also the local oscillator (LO) offset and other distortions like skew, I/Q-imbalance and all kinds of amplitude and/or phase distortions may be compensated before.

According to some implementations, the timing recovery (TR) stage may be placed in the frequency-domain processing after CD and LO offset compensation. Thus after the polarization filter, a FD TR method like the Godard algorithm or the approach described below can be applied.

Figure 2:
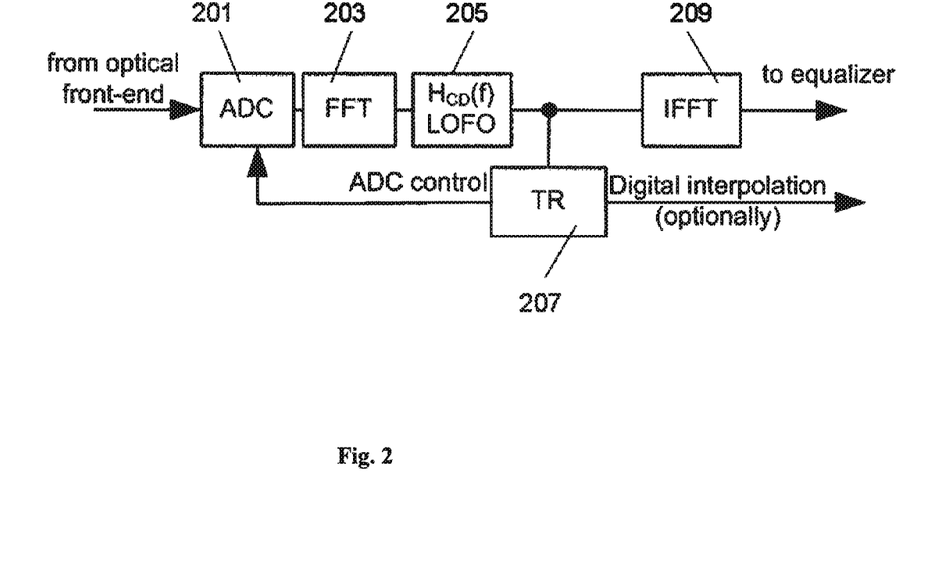
FIG. 2 shows a clock phase recovery apparatus according to an implementation form.

FIG. 2 shows a clock recovery apparatus comprising an analogue-to-digital converter stage 201 having an output coupled to a clock phase recovery apparatus. The clock recovery apparatus may comprise Fourier transforming means 203, e.g. a Fourier transformer, for providing a frequency domain signal, and, optionally, a pre-filter being an all-pass filter or an amplitude filter or a combination thereof 205 for filtering the frequency domain signal. An output of the pre-filter 205 or an output of the Fourier transforming means 103 may be coupled to a clock phase recovery apparatus 207 comprising e.g. correlating means for correlating the frequency domain signal and clock recovery means for recovering the clock frequency. The clock phase recovery apparatus 207 may comprises an output coupled to a control input of the analogue-to-digital converter 201 for controlling its sampling phase or frequency. The phase recovery apparatus 207 may further comprise another output for optional digital interpolation.

An output of the pre-filter 205 or an output of the Fourier transforming means 203 may be coupled to a Fourier transforming means 209 for transforming the frequency domain signal into time domain upon the basis of e.g. an inverse fast Fourier transform (IFFT).

The analogue-to-digital converter 201 may receive a signal corresponding to a single optical polarization or a plurality of distinct signals according to a plurality of different polarizations, e.g. according to a x- and a y-polarization. Thus, the analogue-to-digital converter 201 may output samples time domain signals $r_x[n]$ and $r_y[n]$, wherein n is an index.

According to an implementation form, the digital implementation applies blocks of the sampled sequences $r_x[n]$ and $r_y[n]$ after ADC, transferred into the frequency domain (FD) as $$S_x[m]=\text{FFT}\{\text{Re}\{r_x[n]\}+j\text{Im}\{r_x[n]\}\}$$

$$S_y[m]=\text{FFT}\{\text{Re}\{r_y[n]\}+j\text{Im}\{r_y[n]\}\}$$

with the FFT block size m=1, ..., M. The FD representation of the signal may be extended in bandwidth, which relates to upsampling of the TD signal, to yield $S_{x,up}[m]$ and $S_{y,up}[m]$. After the digital pre-filtering with $H_{pre}$ by means of phase filtering and/or amplitude filtering the signals $$r_x[m]=S_{x,up}[m]\cdot H_{pre}[m]$$

$$r_y[m]=S_{y,up}[m]\cdot H_{pre}[m],$$

may be obtained, which are provided to the matched filter bank. The filtered signal components $$p_x[m]=r_x[m]\cdot H_{11}[m]+r_y[m]\cdot H_{12}[m]$$

$$p_y[m]=r_x[m]\cdot H_{21}[m]+r_y[m]\cdot H_{22}[m]$$

results from filtering with a filter matrix. As described above, the components of the filter matrix may comprise a polarization filter, a CD filter or a combination thereof.

Assuming a polarization rotation filter $$H_{\theta=\pi/4}=\frac{1}{\sqrt{2}}\begin{bmatrix}1 & 1\\ -1 & 1\end{bmatrix}$$

for a polarization rotation of $\theta=\pi/4$, the resulting filtered signal refers to $$p_x[m]=\frac{1}{\sqrt{2}}(r_x[m]+r_y[m])$$

$$p_y[m]=\frac{1}{\sqrt{2}}(r_x[m]-r_y[m]).$$

For a polarization rotation filter $$H_{\theta=0}=\begin{bmatrix}1 & 0\\ 0 & 1\end{bmatrix}$$

for a polarization rotation of $\theta=0$, the resulting filtered signal refers to $$p_x[m]=r_x[m]$$

$$p_y[m]=r_y[m].$$

The timing estimation may be based on correlation means by use of the ACF (Auto-Correlation Function) and the CCF (Cross-Correlation Function), which may be calculated accordingly by $$U_{xx}[\tau]=ACF\{p_x[m]\}$$

$$U_{yy}[\tau]=ACF\{p_y[m]\}$$

$$U_{xy}[\tau]=CCF\{p_x[m],p_y[m]\}$$

The ACF delivers a stable clock tone for channels without half-Baud DGD, the CCF delivers stable clock tones for half-Baud DGD and multiples of it.

Alternatively, the ACF and the CCF may be defined by according convolutions functions using linear or circular convolutions.

From $U[\tau]$ the clock tone is extracted to estimate the clock signal phase.

According to some implementation forms, also averaging over several FFT-blocks, averaging over several estimations and weighting functions $w[\tau]$ to improve the decision variable $U_{imp}[\tau]=w[\tau]U[\tau]$ may be employed.

Figure 3:
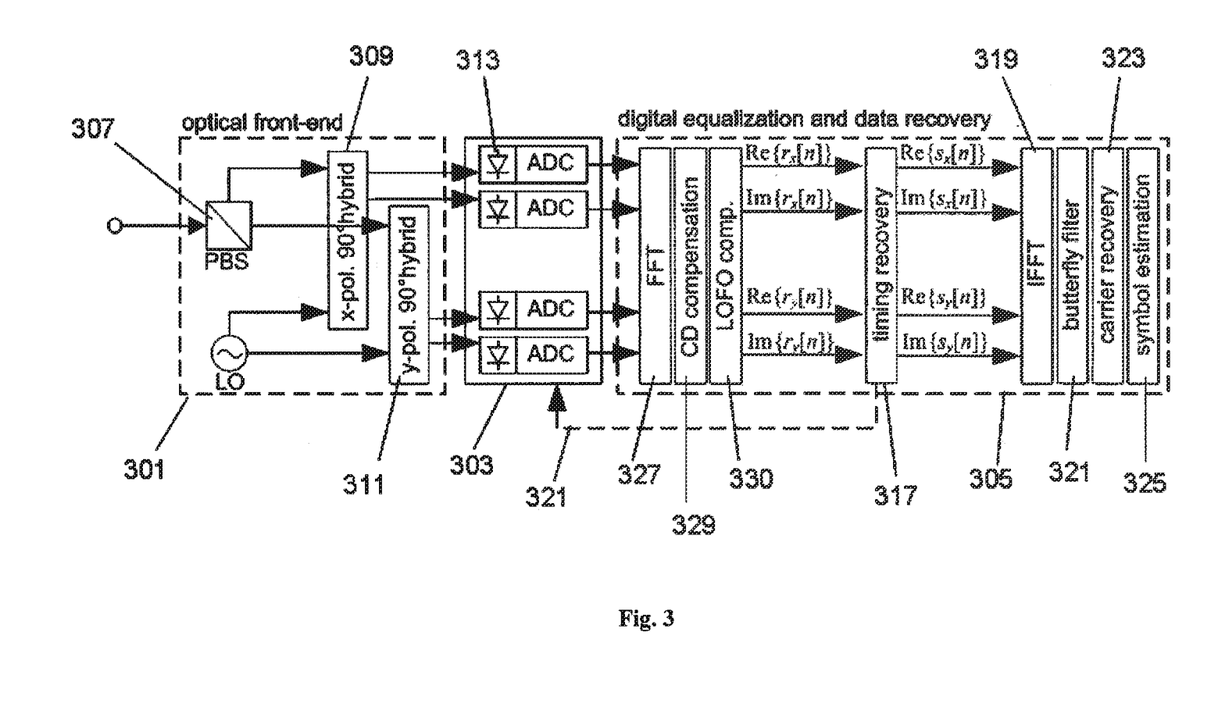
FIG. 3 shows a communications receiver according to an implementation form.

FIG. 3 shows a receiver comprising an optical front end 301 coupled to a synchronization apparatus. The synchronization apparatus comprises optical-to-electrical converting means and analogue-to-digital converting means 303, which is coupled to a processing unit 305.

The optical front end 301 comprises an optical polarization beam splitter 307 providing a signal component according to the x-polarization to a first 90° hybrid 309, and a second signal according to the y-polarization to a second 90° hybrid 311. The 90° hybrids 309 and 311 respectively provide complex valued signals, each having a real and an imaginary value which are provided to the analogue-to-digital converting means 303. Since the complex valued signals provided by the optical front end are optical signals, the analogue-to-digital converting means 303 may comprise, for each signal, an optical converter 313 for converting the respective optical signal into an electrical signal, and an analogue-to-digital converter 315 for converting the respective electrical signal into a digital signal. The digital-to-analogue converting means 303 provides an input signal to the processing unit 305, wherein the input signal may comprise a real and an imaginary portion associated with the x-polarization and a real and an imaginary portion associated with the y-polarization.

The processing unit 305 may comprise the clock phase recovery apparatus 317 with the structure as shown in FIG. 1. The clock phase recovery apparatus 317 may optionally control the ADC 315. Furthermore, optionally, a butterfly filter 321, a carrier recovery means 323 or symbol estimation means 325 may be provided.

The clock phase recovery apparatus 317 may be operated in time domain or in frequency domain. When operated in frequency domain, optionally a FFT (Fast Fourier Transform) 327, a chromatic dispersion compensator 329 or a LOFO compensator 331 may be provided. Furthermore, a IFFT 321 may be present.

According to some implementations, no chromatic dispersion filter may be provided.

Figure 4:
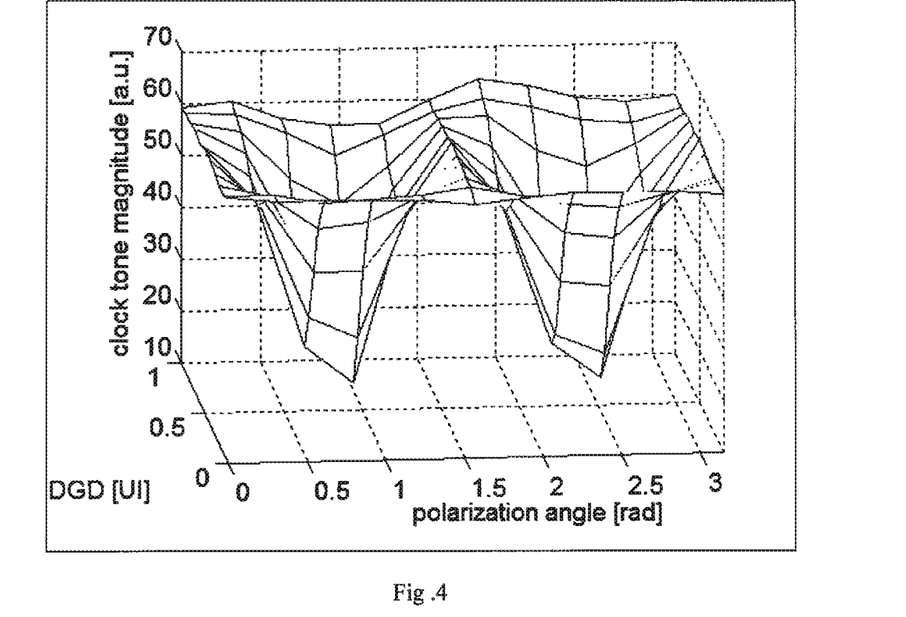
FIG. 4 shows clock signal magnitudes.

FIG. 4 shows a clock signal magnitude for combinations of SOP in terms of radians [rad] and DGD in terms of unit intervals [UI]; e.g. for a combination of DGD=0.5 [UI] and polarization angle of pi/2.

Figure 5:
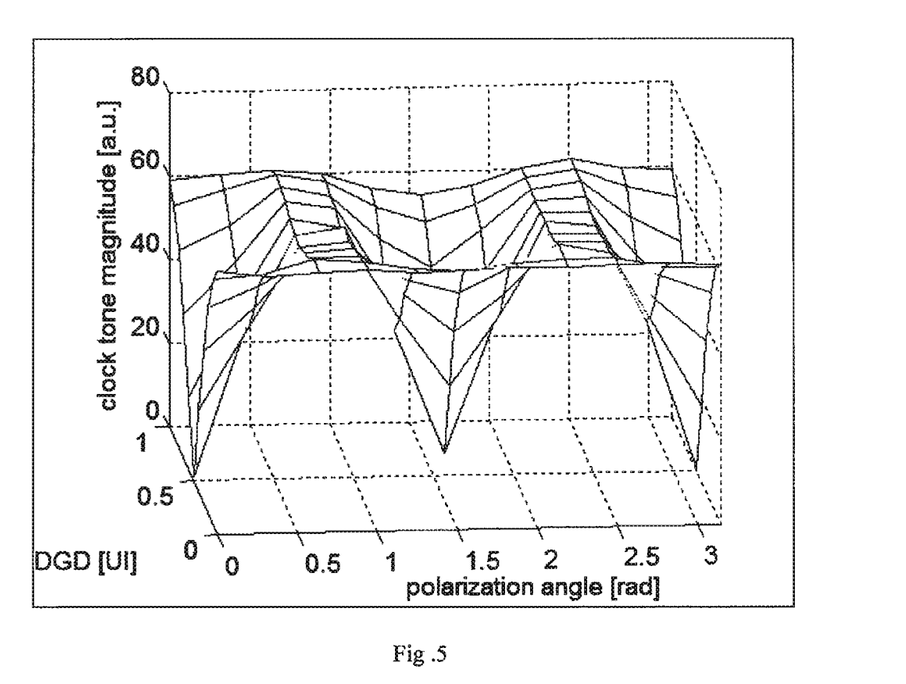
FIG. 5 shows clock signal magnitudes.

FIG. 5 shows a clock signal magnitude for a combination of SOP and DGD after a polarization rotation filter with a polarization angle of θ=pi/4. As shown in FIG. 4, the clock tone at the polarization angle 0, pi/2 or pi combined with a DGD of 0.5 UI is nearly zero, so that the timing information may not be retrieved. However, the clock signal magnitude, i.e. the clock tone magnitude, for polarization angles which are between the minima are significant for clock signal estimation. Without polarization rotation filtering, referring to a polarization rotation with θ=0, the zeros are at the angle pi/4 or 3pi/4 combined with a DGD of 0.5 UI. Thus, when switching between both schemes by selecting the maximum clock tone may avoid channel conditions where no timing information is available.

FIG. 5 shows clock tone magnitude for a combination of SOP and DGD with a polarization filter applying a SOP rotation of pi/4 and a DGD of 0.5 UI. Compared to the embodiment of FIG. 4, the areas with zero clock tone magnitude are clearly at different phases, e.g. at DGD=0.25 [UI] and polarization angle zero. Thus, when switching between both schemes by selecting the maximum clock tone may avoid channel conditions where no timing information is available. Moreover, several other filters with DGD or with different SOP angles may be employed to provide a near optimum solution.

Figure 6:
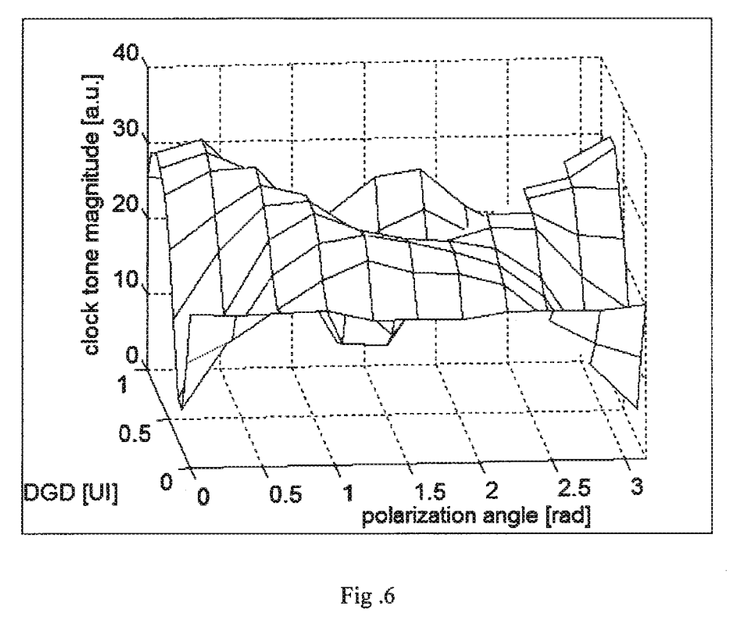
FIG. 6 shows clock signal magnitudes.

With reference to FIGS. 4 and 5, FIG. 5 shows the clock tone magnitude after a rotation of pi/4. In particular, the area with zero clock tone is shifted. Always choosing the phase from the scheme with the maximum clock tone, there is no channel condition (no combination of SOP with DGD) when both matched filters have a zero clock tone at the same time. Alternatively, the same could be achieved by a DGD element, as shown in FIG. 6

According to some implementations, robust and low complexity estimation of timing frequency and phase from the frequency-domain signal in a joint estimation based on both polarizations may be achieved. The frequency domain estimation may allow for a low complexity implementation with enhanced pre-filtering and short delay for closed loop operation. Robustness against polarization effects, differential group delay (DGD) in particular, may further be achieved by selecting the best result from a bank of several SOP polarization rotation filters. The best result is obtained by the SOP polarization rotation filter that matches (nearly) the inverse of the SOP state in the channel. The same applies for chromatic dispersion effects, by selecting the best result from a bank of several chromatic dispersion filters or a combination of polarization filters and chromatic dispersion filter. The estimation approach is suitable for any modulation format in combination with a polarization-diverse digital coherent receiver. Furthermore, neither an adaptation of the SOP filter coefficients nor a feedback of the update control signal, which can be detected in the digital circuitry, are required. The same applies for the chromatic dispersion filter, where neither an adaptation of the chromatic dispersion filter coefficients nor a feedback of the update control is required.

It will be apparent to those skilled in the art that various modifications and variations can be made in the disclosed embodiments without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A clock phase recovery apparatus for estimating an estimated clock phase, the clock phase recovery apparatus comprising:
a clock estimator for estimating a first clock signal and a second clock signal upon the basis of an input signal, the input signal comprising a first sub-signal according to a first optical polarization and a second sub-signal according to a second optical polarization, the first clock signal comprising a first clock magnitude and a first clock phase, the second clock signal comprising a second clock magnitude and a second clock phase;
a selector for selecting the first clock phase to form the estimated clock phase if the first clock magnitude is greater than the second clock magnitude, or for selecting the second clock phase to form the estimated clock phase if the second clock magnitude is greater than the first clock magnitude.

2. The clock phase recovery apparatus of claim 1, wherein the clock estimator is configured to differently filter the input signal to obtain a first filtered input signal and a second filtered input signal, to estimate the first clock signal upon the basis of the first filtered input signal, and to estimate the second clock signal upon the basis of the second filtered input signal.

3. The clock phase recovery apparatus of claim 1, wherein the clock estimator comprises a first chromatic dispersion filter for filtering the input signal to obtain a first filtered input signal, and a second chromatic dispersion filter for filtering the input signal to obtain a second filtered input signal.

4. The clock phase recovery apparatus of claim 1, wherein the clock estimator comprises a filter bank comprising a plurality of chromatic dispersion filters, each chromatic dispersion filter being configured to filter the input signal by a different predetermined chromatic dispersion value to obtain a plurality of filtered input signals, wherein the clock estimator is configured to estimate a plurality of clock signals upon the basis of the plurality of the filtered input signals, and wherein the selector is configured to select the clock phase or the clock signal which has the greatest clock magnitude among the plurality of estimated clock signals to provide the estimated clock phase.

5. The clock phase recovery apparatus of claim 1, wherein the clock estimator comprises a first polarization rotation filter for filtering the input signal to obtain a first filtered input signal, and a second polarization rotation filter for filtering the input signal to obtain a second filtered input signal, the first polarization rotation filter being configured to rotate a polarization of the input signal by a predetermined first angle, the second polarization rotation filter being configured to rotate a polarization of the input signal by a predetermined second angle.

6. The clock phase recovery apparatus of claim 4, wherein the clock estimator comprises a first estimator arranged downstream the first polarization rotation filter to estimate the first clock signal upon the basis of the first filtered input signal, and wherein the clock estimator comprises a second estimator arranged downstream the second polarization rotation filter to estimate the second clock signal upon the basis of the second filtered input signal.

7. The clock phase recovery apparatus of claim 1, wherein the clock estimator comprises a filter bank comprising a plurality of polarization rotation filters, each polarization rotation filter being configured to rotate a polarization of the input signal by a different predetermined angle to obtain a plurality of filtered input signals, wherein the clock estimator is configured to estimate a plurality of clock signals upon the bass of the plurality of filtered input signals, and wherein the selector is configured to select the clock phase of the clock signal, which as the greatest clock magnitude, as the estimated clock phase.

8. The clock phase recovery apparatus of claim 1, wherein the clock estimator comprises a polarization rotation filter for rotating a polarization of the input signal at a first time instant by a predetermined first angle to obtain a first filtered input signal, and for rotating a polarization of the input signal at a second time instant by a predetermined second angle to obtain a second filtered input signal, and wherein the clock estimator comprises an estimator for successively estimating the first clock signal upon the basis of the first filtered input signal, and the second clock signal upon the basis of the second filtered input signal.

9. The clock phase recovery apparatus of claim 1, wherein the clock estimator is configured to correlate, in particular to auto-correlate or to cross-correlate, the polarization components of the first sub-signal and the second sub-signal, to estimate the first clock signal or the second clock signal.

10. The clock phase recovery apparatus of claim 1, wherein the selector comprises a comparator for comparing the first clock magnitude and the second clock magnitude.

11. The clock phase recovery apparatus of claim 1, wherein the clock estimator is configured to estimate the first clock signal and the second clock signal upon the basis of the input signal which comprises uncompensated chromatic dispersion.

12. The clock phase recovery apparatus of claim 1, wherein the first sub-signal and the second sub-signal respectively comprise a real signal component and an imaginary signal component.

13. A communications receiver comprising the clock phase recovery apparatus of claim 1.

14. A method for estimating an estimated clock phase, the method comprising:
estimating a first clock signal and a second clock signal upon the basis of an input signal, the input signal comprising a first sub-signal according to a first optical polarization and a second sub-signal according to a second optical polarization, the first clock signal comprising a first clock magnitude and a first clock phase, the second clock signal comprising a second clock magnitude and a second clock phase; and
selecting the first clock phase to form the estimated clock phase if the first clock magnitude is greater than the second clock magnitude, or selecting the second clock phase to form the estimated clock phase if the second clock magnitude is greater than the first clock magnitude.

* * * * *